United States Patent Office 3,337,337
Patented Aug. 22, 1967

3,337,337
METHOD FOR PRODUCING FIBER REINFORCED METALLIC COMPOSITES
John W. Weeton, Rocky River, Max Quatinetz, Bay Village, and Robert W. Jech, Lakewood, Ohio, assignors to the United States of America as represented by the Administrator of the National Aeronautics and Space Administration
No Drawing. Filed Dec. 16, 1965, Ser. No. 514,407
12 Claims. (Cl. 75—204)

ABSTRACT OF THE DISCLOSURE

Equiaxed particles of refractory additives are fibered in situ in a high melting point metallic matrix. The additives are deformed at temperatures lower than the melting point of the matrix.

---

The invention described herein may be manufactured and used by or for the Government of the United States of America for governmental purposes without the payment of any royalties thereon or therefore.

This invention is concerned with the fiber reinforcing of metallic composites. More particularly, the invention relates to improved metallic composites reinforced with ceramic and refractory hard metals that are fibered in situ.

The success of many aerospace endeavors is dependent upon high strength materials having improved properties at elevated temperatures. Also, materials having high strength-to-weight ratios are required for many space applications. The use of metals having high melting points has been proposed for such applications. However, many of these metals are ordinarily brittle and difficult to work, and such deficiencies limit their use. While tungsten, for example, has a high melting point, its strength properties deteriorate rapidly with increases in temperatures, and it has a high density together with a high ductile-to-brittle transition temperature.

The high temperature strength and stability of many of these metals can be improved by the addition of fibers. However, a number of inherent difficulties are encountered in the fiber reinforcing of refractory materials to form composites. In the case of conventional low melting composites, the melting point of the additives is generally well above that of the matrix. However, with refractory matrices there are fewer additives having suitable melting points, and these high temperature materials are not readily available in fiber form. There is also a possibility of damage to the fibers during the processing necessary to embed them in the matrix at higher temperatures. As in the case of dispersion strengthening of refractory matrices, it is necessary to have fiber additives that are thermodynamically stable and do not react with the matrix or other elements present at the high processing and use temperatures employed.

Some of these problems have been solved by the deliberate fibering of refractory additives in situ in the higher melting point matrix. According to the present invention, this fibering is accomplished by embedding equiaxed additives in a matrix and elongating these additives into fibers by extrusion, swaging, or rolling. The additives are deformable at temperatures which are lower than the melting point of the matrix.

Because the additives are fibered within the matrix, they are less subject to damage than if exposed to air or atmospheres containing reactive impurities. Also, the fibers are not subjected to the rough handling as well as the high pressures and temperatures required by the processing when fibers are embedded in a matrix in a conventional manner. Since the fiber surfaces are created in contact with the matrix during extrusion, the in situ process offers a better opportunity to retain good bonding at the fiber-matrix interface. During extrusion the matrix acts to distribute the stresses more nearly isostatically around each particle of additive, and this permits relatively strong, hard, and brittle additives to be deformed and elongated.

It is, therefore, an object of the present invention to provide an improved fiber reinforced metallic composite wherein the fibers are produced within the material by mechanical working without permitting the fibers to be exposed to external atmospheres.

Another object of the invention is to provide an improved metallic composite reinforced with ceramic and refractory hard metal having high resistance to deformation and to crack formation.

A still further object of the invention is to provide an improved method of processing tungsten wherein the required extrusion pressure is reduced by the addition of certain oxides.

Other objects and advantages of the invention will be apparent from the specification which follows.

A composite is made in accordance with the present invention by adding powdered materials of a refractory nature to metallic powder matrix materials. These refractory materials may be oxides, refractory compounds, and even metallic materials, such as refractory metals. The powdered refractory materials, or the materials that are considered to be the strongest or desired additive, are added to the composite and are fibered during fabrication by extrusion. In this manner, the fibers are created and embedded simultaneously during fabrication.

In order to illustrate the features of the present invention, refractory composites were prepared with relatively coarse refractory additive powders having a wide range of melting temperatures and reactivity. Composites comprising a tungsten matrix with 5 to 16 volume percent of oxide or refractory compound were extruded into bar stock. Tungsten was selected because its high melting point offered the use of a wide range of temperatures required for processing and a relatively stiff matrix which could better transmit to the less deformable additives the high stresses necessary to elongate them during extrusion.

Oxides in the form of zirconia, yttria, hafnia, and thoria were used as additives. The refractory compounds added were hafnium boride, nitride, and carbide as well as tantalum carbide. The billets were extruded at temperatures of 3700° to 4200° F. at reduction ratios from 8:1 to 20:1.

The powders used in preparing the billets are shown in Table I. The compositions of the billets and their processing are set forth in Table II.

TABLE I.—BILLET MATERIALS

| Material | Nominal purity, weight percent | Particle size | Melting point, ° F. | Density, g./cc. |
|---|---|---|---|---|
| Tungsten | 99.96 | 1.2 | 6,170 | 19.30 |
| Zirconia | 98.80 | 2.0 | 4,892 | 5.49 |
| Yttria |  | 1.7 | 4,370 | 4.84 |
| Hafnia | 99.92 | 1.9 | 5,090 | 9.68 |
| Thoria |  | 2.1 | 5,522 | 10.03 |
| Hafnium boride | 93.3 | 6.8 | 5,880 | 11.20 |
| Hafnium nitride | 96.6 | 4.6 | 5,990 | 14.00 |
| Hafnium carbide | 95.4 | 4.2 | 7,039 | 12.70 |
| Tantalum carbide | 99.85 | 5.0 | 7,020 | 14.65 |

Referring to Table I, the hafnium boride contained 2.9 percent zirconium, titanium, and carbon while the hafnium nitride contained 3 percent zirconium. The hafnium carbide contained 4.6 percent zirconium, titanium, and boron.

All but one of the billets were made by using 2500 to 4000 grams of nominally 1 micron tungsten powder. The oxides zirconia, yttria, hafnia, and thoria were nominally 2 microns in average diameter while the refractory compounds hafnium boride, hafnium nitride, hafnium carbide, and tantalum carbide were nominally 4 to 7 microns.

8:1 to 16:1 and ram speeds from 3.6 to 14.4 inches per second. Unclad billets 6 and 7 were extruded at a reduction ratio of 20:1 in a high-energy press while the remaining billets were extruded in a conventional 1000 ton vertical extrusion press.

The tungsten and tungsten composites shown in Table II were canned in containers of the softer materials, tantalum and molybdenum, to provide adequate lubrication in

TABLE II.—TUNGSTEN BILLET COMPOSITION AND PROCESSING

| | Composition | | Extrusion | | |
|---|---|---|---|---|---|
| Additive | Percent | Temperature, °F. | Reduction ratio | Maximum extrusion pressure, lb./sq. in. | Ram speed, in./sec. |

VACUUM-SINTERED BILLETS

| # | Additive | Percent | Temperature | Reduction ratio | Max. pressure | Ram speed |
|---|---|---|---|---|---|---|
| 1 | | 0 | 3,700 | 8:1 | 194.0×10³ | 6.0 |
| 2 | | 0 | 4,050 | 8:1 | | 4.0 |
| 3 | Zirconia | 8.0 | 4,200 | 8:1 | 183.0 | 5.3 |
| 4 | Yttria | 8.0 | 4,200 | 8:1 | 106.2 | 10.0 |
| 5 | Hafnia | 10.0 | 4,200 | 8:1 | 106.0 | 10.0 |
| 6 | Zirconia | 5.0 | 3,800 | 20:1 | | |
| 7 | ...do | 5.0 | 3,800 | 20:1 | | |

HYDROGEN-PRESINTERED BILLETS

| # | Additive | Percent | Temperature | Reduction ratio | Max. pressure | Ram speed |
|---|---|---|---|---|---|---|
| 8 | | 0 | 4,200 | 8:1 | 115.7×10³ | 8.6 |
| 9 | | 0 | 4,200 | 16:1 | | |
| 10 | | 0 | 4,200 | 16:1 | | |
| 11 | Zirconia | 14.5 | 4,200 | 8:1 | 79.8 | 14.4 |
| 12 | Thoria | 8.0 | 4,200 | 8:1 | 80.8 | 4.0 |
| 13 | ...do | 16.0 | 4,200 | 8:1 | 125.7 | 3.6 |
| 14 | Hafnium boride | 8.0 | 4,200 | 8:1 | 131.7 | 9.8 |
| 15 | Hafnium nitride | 8.0 | 4,200 | 8:1 | 172.6 | 6.6 |
| 16 | Hafnium carbide | 8.0 | 4,200 | 8:1 | 197.6 | 4.0 |
| 17 | Tantalum carbide | 8.0 | 4,200 | 8:1 | 173.6 | 9.0 |

The powders used to prepare the composites were weighed and placed in a container approximately one-third full with one quarter inch diameter glass beads. Mixing occurred as the container was rolled at relatively slow speeds. The speed was such that the powder rolled gently over itself without sliding or clinging to the sides of the container.

The tungsten and tungsten-additive mixtures for billets 2 to 5 shown in Table II were cleaned in a tower with a stream of hydrogen at 1500° F. for six hours before compaction in order to reduce any tungsten oxide present to the metal. The hydrogen flow rate was regulated between 5 to 15 cubic feet per hour. The cleaning tower was heated slowly to maintain the moisture evolved below 1000 parts per million and to prevent localized sintering.

All the powders were compacted isostatically at 30,000 pounds p.s.i. and room temperature. The powder was packed initially in a rubber mold set in a metal tube so that, after pressing and sintering, the billet required a minimum of machining for canning and extruding.

Two separate sintering schedules were utilized as shown in Table II. Billets 1 to 7 were sintered for two hours at a pressure of less than $5\times10^{-5}$ torr and at a temperature of 3500° F. Billets 1 to 5 were then sintered in vacuum at 4200° F. for two hours while billets 6 and 7 were sintered in vacuum at 4200° F. for four hours. In processing billets 8 to 17, the compacts were given a two-hour presintering in hydrogen at 2600° F. followed by two-hour sintering in vacuum at 4200° F. to obtain improved density.

Billets 1 to 5 were extruded in a tantalum can having a wall thickness of 0.09 inch thick. Billets 8, 9 and 11 to 17 were extruded in a 0.25 inch-thick-wall pressed and sintered molybdenum can. Billet 10 was extruded in a 0.25 inch-thick-wall tantalum can. Temperatures from 3700° to 4200° F. were utilized with reduction ratios of the high temperature range of 3800° to 4200° F. A variety of metals and other materials, such as oxides, glass, graphite and rubber were used as container lubricants. Oxides were also used to coat the extrusion die.

The use of soft metal canning materials also introduced a more nearly isostatic conditon in which the extruding pressure was distributed more uniformly about the billet. While tantalum is quite effective as a canning material, less expensive molybdenum cans produced by powdered metallurgy techniques were satisfactory. The cans also served to protect the billets from contamination. In this manner, the extrusion capability for tungsten billets was extended to higher reduction ratios of 16:1 and higher temperatures of approximately 4200° F.

Stress-rupture tests of the extruded materials were conducted in a vacuum of $5\times10^{-5}$ torr at different stress levels at 3000° F. A number of tests were also conducted at 2500°, 3400°, 3500°, and 3800° F. Photomicrographs of the extruded bars and of the ruptured stress-rupture specimens were prepared and examined. In addition, fiber length-diameter ratios were determined so that these parameters could be correlated with the stress-ruptured life of the composites. With a few composites step-load creep tests were run to evaluate rapidly their strength potential and to obtain suitable stresses for short-time stress-rupture tests. The results of certain of these tests are tabulated in Table III.

Photomicrographs of transverse and longitudinal sections of the extruded materials showed that some degree of fibering was achieved with all the additives. In general, the oxides are more effectively fibered than the refractory compounds. From the microstructures it was noted that the extent of elongation varied with the degree of deformation throughout the extruded bar. The elongation was greater at the center than at the nose of the bar and greater at the edge than in the middle. The photo-

TABLE III.—EXPERIMENTAL RESULTS

| Billet | Stress-rupture properties | | | Fiber length-diameter ratio |
|---|---|---|---|---|
| | Temperature, °F. | Stress, p.s.i. | Stress-rupture, life, hr. | |
| 1 | 3,000 | 8,000 | 1.9 | |
| 2 | 3,000 | 8,000 | 1.5 | |
| | 3,000 | 8,000 | 2.6 | |
| | 3,000 | 5,000 | 53.8 | |
| | 3,000 | 3,000 | 348.7 | |
| 3 | 3,000 | 8,000 | 10.0 | 19.1 |
| | 3,000 | 5,000 | 74.5 | |
| | 3,800 | 3,000 | 4.3 | |
| 4 | 3,000 | 8,000 | 8.5 | 12.7 |
| | 3,000 | 7,000 | 23.5 | |
| | 3,000 | 6,000 | 44.9 | |
| | 3,000 | 4,000 | 161.0 | |
| | 3,400 | 3,000 | 25.5 | |
| | 3,800 | 3,000 | 1.6 | |
| 5 | 3,000 | 8,000 | 10.3 | 23.3 |
| | 3,000 | 5,000 | 261.4 | |
| | 3,400 | 3,000 | 34.7 | |
| 6 | 3,000 | 8,000 | 3.8 | 12.5 |
| 7 | 3,000 | 8,000 | 4.5 | 29.3 |
| 8a | 3,000 | 8,000 | 21.6 | |
| 8b | 3,000 | 8,000 | 13.2 | |
| 9 | 3,000 | 8,000 | 20.1 | |
| | 3,000 | 8,000 | 29.1 | |
| 10 | 3,000 | 8,000 | 18.9 | |
| 11 | 3,000 | 8,000 | 1.6 | 23.8 |
| 12 | 3,000 | 8,000 | 34.2 | 7.8 |
| 13 | 3,000 | 28,000 | 36.9 | 13.2 |
| 14 | 3,000 | 8,000–20,000 | 223.3 | 1.0 |
| | 3,000 | 8,000 | 545.0 | |
| | 3,000 | 18,000 | 83.5 | |
| | 3,000 | 28,000 | 3.2 | |
| | 3,500 | 8,000 | 4.0 | |
| | 2,500 | 28,000 | 323.9 | |
| 15 | 3,000 | 8,000–10,000 | 292.2 | 18.4 |
| | 3,000 | 8,000 | 388.0 | |
| | 3,000 | 12,000 | 101.1 | |
| | 3,000 | 18,000 | 21.5 | |
| | 3,500 | 8,000 | 4.2 | |
| | 2,500 | 24,000 | 45.4 | |
| 16 | 3,000 | 8,000–18,000 | 164.9 | 6.6 |
| | 3,000 | 8,000 | 1,145.0 | |
| | 3,000 | 18,000 | 77.9 | |
| 17 | 3,000 | 8,000–14,000 | 414.6 | |
| Nose | 3,000 | 8,000 | 920.0 | |
| Middle | 3,000 | 8,000 | 388.6 | 5.1 |
| | 2,500 | 12,000 | 487.9 | | micrographs of the oxide composites showed substantial fibering was obtained with zirconia, yttria, and hafnia. However, the thoria was not elongated as much as the other oxides. When the length to diameter ratios shown in Table III are examined it is evident that the overall order of elongation from the highest to the lowest is hafnia, zirconia, yttria, and thoria.

Examination of the tungsten-refractory-compound composites showed the hafnium nitride to be fibered the most effectively. While the tantalum carbide was noticeably deformed in the middle section the elongation was small compared to that of hafnium nitride. With the refractory compound composites, in most cases there was a small elongation at the nose of the extrusion bars, and the fibering increases towards the middle of the bar. The order of elongation from the highest to the lowest was hafnium nitride, hafnium carbide, tantalum carbide, and hafnium boride.

The results of stress-rupture testing of the as-extruded tungsten and tungsten composites are given in Table III. Specimens from five extruded tungsten billets 1, 2, 8, 9, and 10 had stress-rupture lives at 3000° F. and 8000 p.s.i in vacuum from 1.5 to 29.1 hours. Billet 8(b) was swayed fifty percent.

The most significant variable was the sintering schedule as evidenced by Table III. Billets 1 and 2 which were sintered in vacuum at 3500° F. and 4200° F. had stress-rupture lives of 1.5 to 2.6 hours. Billets 8, 9 and 10 which were sintered at 2600° F. in hydrogen followed by vacuum sintering at 4200° F. had stress-rupture lives at the same load and temperature of 18.9 and 29.1 hours.

Stress-rupture results of low oxide composites containing 8 to 10 volume percent of the additives are likewise shown in Table III. Most of the observations of the effect of low-volume percent oxide additions to tungsten are shown in billets 3, 4, 5 and 12. It is evident from Table III that specimens from billets 3, 4 and 5 exhibited a fourfold to five-fold increase in stress-rupture life when compared with the unreinforced tungsten of billet 1 prepared under the same conditions by vacuum sintering. The tungsten 8 volume percent thorio composite of billet 12 prepared with a hydrogen presinter had 3 to 4 times the stress-rupture life of the other oxide composites.

The stress-rupture life at 3000° F. and 8000 p.s.i. of the tungsten-hafnium boride, nitride, or carbide composites and tantalum carbide composites were at least an order of magnitude greater than those of the unreinforced material. While the composites containing hafnium boride and hafnium carbide had greater stress-rupture lives than the composites containing the hafnium nitride and tantalum carbide, the latter two composites exhibited better ductility.

Specimens from billet 14 to 17 exhibited unusally low creep rates. The creep rate at 3000° F. with an 8000 p.s.i. load was $2.88 \times 10^{-8}$ per second for tungsten-hafnium boride, $4.28 \times 10^{-8}$ per second for tungsten-hafnium carbide, and $2.55 \times 10^{-7}$ per second for tungsten-hafnium nitride. The order for total elongation before fracture was tungsten-hafnium nitride, carbide, and boride, the nominal percentages being 38, 18, and 8, respectively.

The aforementioned tests of the extruded billets indicate that by using a lower temperature hydrogen pre-sintering prior to high temperature vacuum sintering with tungsten, an increase in stress-rupture life and ductility is obtained. It is also evident the additives markedly effect the pressures required for extrusion. The oxides decrease the extrusion pressure required for tungsten because they are more easily deformed than the matrix at the extrusion temperature. Thus, it is apparent the oxide additions assist in the processing of tungsten by reducing the extrusion pressure.

Inasmuch as the additives are lower in density than the tungsten, they aid in decreasing the weight of the final product. Inasmuch as these additives simultaneously strengthen the product, the combined effect markedly increases the strength-weight ratio. From Table III it is apparent the strengthening effects are most noticeable with oxide concentrations between 8 and 16 volume percent. That most of the billets extruded had good density was confirmed by the fact that very little, if any, porosity was seen in most of the microstructures.

While the beneficial technical effect of the invention has been shown by the fibering of various additives in tungsten, it will be appreciated that other matrix materials, as well as other additives, can be used without departing from the spirit of the invention or the scope of the subjoined claims. For example, it is contemplated that string fiber composites can be obtained by applying the in situ method of fibering to other matrix materials which have lower moduli and higher creep rates than tungsten.

Even though tungsten, which has an extremely high melting point, was used as the matrix metal, it is contemplated that metals covering melting point ranges from relatively low to the very highest melting points may be used as the base material for composites made in accordance with the invention. A matrix material, such as iron or steel, might be reinforced with specific refractory compounds added to the matrix provided the softening temperature makes them deformable below the melting point of the matrix.

While the invention is used for strengthening composites, a composite may be desired which has a strength essentially no greater than that of the matrix, but the density of the composite would be much less than that of the matrix. To meet these requirements a higher strength-to-weight ratio material would be fabricated according to the invention.

It is further contemplated that the method of the invention can be used to produce a material that is less expensive than a material made from a matrix alone. By way of example, a ceramic that is relatively inexpensive can be added in fairly large quantities to an expensive matrix thereby reducing the quantity of the expensive matrix material.

It is further contemplated the disclosed method can be used to produce fibers of substances that are not available in fiber form. After the composite is produced in accordance with the invention, the fibers are removed by dissolving the matrix.

While the powders in the foregoing examples were fibered by extrusion, other methods, such as the application of hydrostatic pressure, may be utilized to accomplish the elongation of the materials which are difficult to fiber. The desired deformation may be obtained by encasing the entire product in a thick sheath of a more ductile material and rolling the encased product. During this rolling considerable hydrostatic pressure is applied to the edges of the material. Swaging can also be used to elongate or fiber the material.

According to the invention, powders or short length fibers of material which are difficult to forge are set in a more ductile or different matrix material. Curved filaments may be embedded in the matrix material in a similar manner. Short length ceramics, as well as ceramic or refractory metal chips, can likewise be embedded in a metallic matrix. A felted material of a fiber product consisting of refractory materials, refractory compounds, or oxides can be infiltrated with a matrix and subsequently forged or elongated by extrusion or forging to produce a fiber product.

The method of putting together the components of the composite can be varied considerably. The compaction of two or more constituents to be fabricated into a composite by the method of the invention may include such techniques as mechanical mixing and blending, infiltration of powders by liquids, and infiltration of felts or mats by liquids. Also, long fibers of hard materials, such as those listed previously, can be embedded in metallic matrices, and the fibers are further elongated according to the invention for increased strengthening of the products.

Other chemical or physical methods of producing two or more phase composites that will produce relatively equiaxed phases in a metallic mixture may be used. Any such product, whether vapor deposited, electrochemical deposited, co-precipitated, or electrophoretic mixtures can be fabricated according to the present invention. At least one of the constituents in the composite is fibered during fabrication.

What is claimed is:

1. A method of fibering a refractory material in situ comprising the steps of
   mixing 5 to 16 volume percent of equiaxed particles of the refractory material to be fibered with a powdered metallic matrix material having a melting temperature higher than the temperature at which said equiaxed particles are deformable,
   compacting the mixture isostatically to form a billet,
   heating said billet to an elevated temperature above 3700° F., and
   elongating said particles by extruding said billet at said elevated temperature.

2. A method of fibering as claimed in claim 1 wherein the refractory particles have a size substantially greater than the size of the matrix particles.

3. A method of fibering as claimed in claim 1 wherein the refractory particle material is a powdered oxide.

4. A method of fibering as claimed in claim 1 wherein the refractory particle material is a powdered refractory compound.

5. A method of fibering as claimed in claim 1 wherein the refractory particles to be fibered are surrounded by powdered tungsten.

6. A method of fibering as claimed in claim 5 wherein the refractory material to be fibered is selected from the group consisting of zirconia, yttria, hafnia, and thoria.

7. A method of fibering as claimed in claim 6 wherein the tungsten powders have a particle size of about 1 micron and the particles to be fibered have a size of about 2 microns.

8. A method of fibering as claimed in claim 5 wherein the refractory material to be fibered is selected from the group consisting of hafnium boride, hafnium nitride, hafnium carbide, and tantalum carbide.

9. A method of fibering as claimed in claim 8 wherein the tungsten powders have a particle size of about 1 micron and the refractory particles to be fibered have a size from 4 to 7 microns.

10. A method of fibering as claimed in claim 6 including sintering the mixed particles in vacuum at 3500° F. followed by sintering in vacuum at 4200° F.

11. A method of fibering as claimed in claim 5 including sintering in hydrogen at 2600° F. followed by sintering in vacuum at 4200° F.

12. A method of fibering as claimed in claim 5 including the step of extruding the billet at a temperature between 3700° F. and 4200° F. at a speed between 3.6 and 14.4 inches per second.

References Cited
UNITED STATES PATENTS

| | | | |
|---|---|---|---|
| 3,047,383 | 7/1962 | Slayter | 29—182.5 |
| 3,136,039 | 6/1964 | Keith | 75—207 |
| 3,282,658 | 11/1966 | Wainer. | |
| 3,285,825 | 11/1966 | Jens | 176—90 X |
| 3,291,577 | 12/1966 | Davies et al. | |

BENJAMIN R. PADGETT, *Primary Examiner.*

L. DEWAYNE RUTLEDGE, CARL D. QUARFORTH,
*Examiners.*

R. L. GRUDZIECKI, *Assistant Examiner.*